(12) United States Patent
Martin

(10) Patent No.: US 8,857,452 B2
(45) Date of Patent: Oct. 14, 2014

(54) RADIAL FLOW FILTER WITH TRAVELING SPRAY DEVICE

(76) Inventor: John D. Martin, Wichita Falls, TX (US)

(*) Notice: Subject to any disclaimer, the term of this patent is extended or adjusted under 35 U.S.C. 154(b) by 397 days.

(21) Appl. No.: 12/736,103

(22) PCT Filed: Mar. 10, 2009

(86) PCT No.: PCT/US2009/001523
§ 371 (c)(1),
(2), (4) Date: Sep. 9, 2010

(87) PCT Pub. No.: WO2009/114128
PCT Pub. Date: Sep. 17, 2009

(65) Prior Publication Data
US 2011/0000506 A1  Jan. 6, 2011

Related U.S. Application Data

(60) Provisional application No. 61/068,715, filed on Mar. 10, 2008.

(51) Int. Cl.
| B08B 7/00 | (2006.01) |
| B08B 7/04 | (2006.01) |
| B08B 3/04 | (2006.01) |
| B08B 3/02 | (2006.01) |
| B08B 9/043 | (2006.01) |
| B08B 9/00 | (2006.01) |
| B01D 41/04 | (2006.01) |
| B08B 9/023 | (2006.01) |

(52) U.S. Cl.
CPC . *B08B 9/00* (2013.01); *B08B 3/024* (2013.01); *B08B 9/0433* (2013.01); *B01D 41/04* (2013.01); *B08B 9/023* (2013.01)

USPC ........... 134/172; 134/152; 134/157; 134/175; 134/176

(58) Field of Classification Search
USPC .......... 134/34, 36, 22.18, 900, 138, 152, 153, 134/157, 172, 175, 176, 166 R, 167 R
See application file for complete search history.

(56) References Cited

U.S. PATENT DOCUMENTS

| 3,630,447 | A |   | 12/1971 | Smart et al. |
| 3,843,408 | A |   | 10/1974 | Tobin |
| 4,836,702 | A | * | 6/1989 | Allen .............................. 401/10 |
| 5,228,993 | A | * | 7/1993 | Drori ............................ 210/332 |
| 5,268,095 | A | * | 12/1993 | Barzuza ........................ 210/143 |
| 5,292,074 | A | * | 3/1994 | Clark et al. .................... 239/546 |
| 5,384,045 | A | * | 1/1995 | Chmielewski et al. ....... 210/354 |
| 5,409,027 | A | * | 4/1995 | Glunt ............................ 134/138 |

(Continued)

*Primary Examiner* — Alexander Markoff
(74) *Attorney, Agent, or Firm* — Roger N. Chauza, PC

(57) ABSTRACT

A spray device for cleaning residue from a filter member. In one embodiment, the spray device includes a tubular stem telescopically slideable in a sleeve. A coil spring surrounds the stem and resists movement of the stem out of the sleeve. A tubular halo with nozzles is fastened to the end of the tubular stem so that when a pressurized fluid is applied to the stem, the stem is forced out of the sleeve against the spring force, thereby causing the halo to travel along a cylindrical filter surface. The pressurized fluid is also jetted from the nozzles and cleans the cylindrical surface. When the pressurized fluid is removed from the spray device, the spring retracts the stem and the halo back to a rest position. In another embodiment, the halo is replaced with a nozzle head that moves within a cylindrical filter surface to be cleaned.

21 Claims, 7 Drawing Sheets

(56) References Cited

U.S. PATENT DOCUMENTS

| | | | |
|---|---|---|---|
| 5,514,270 A * | 5/1996 | Barzuza | 210/356 |
| 6,340,383 B1 * | 1/2002 | Jensen et al. | 96/233 |
| 6,463,943 B1 * | 10/2002 | Monroe | 134/152 |
| 6,715,501 B2 * | 4/2004 | Pociask | 134/138 |
| 6,871,658 B2 | 3/2005 | Gjestvang | |
| 6,896,798 B2 * | 5/2005 | Dover et al. | 210/170.02 |
| 7,175,154 B2 * | 2/2007 | Bereznai | 251/22 |
| 2007/0107391 A1 * | 5/2007 | Reining | 55/302 |

* cited by examiner

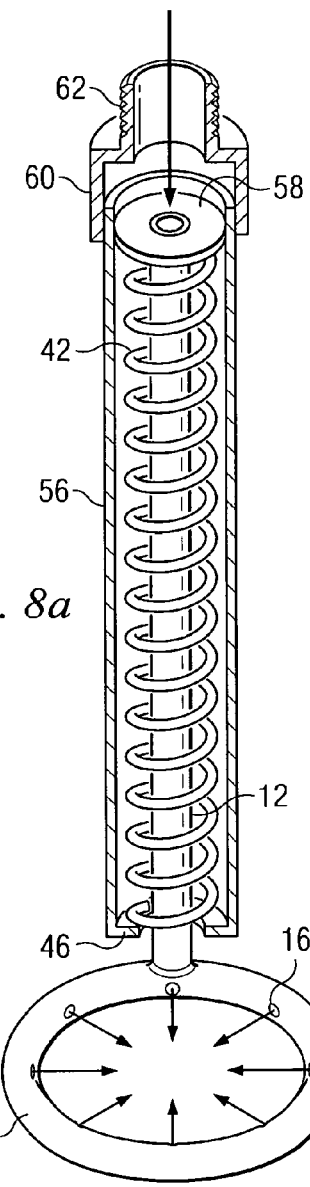
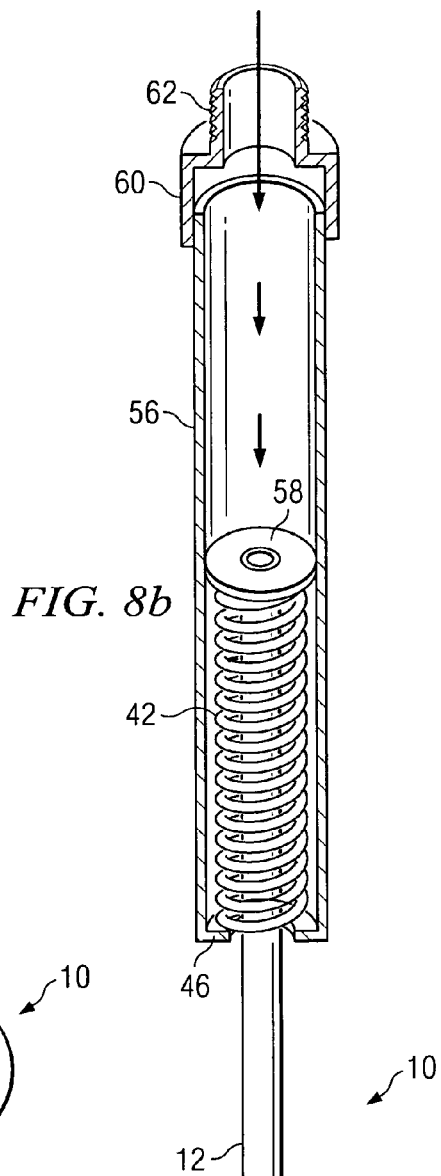
*FIG. 8a*  *FIG. 8b*
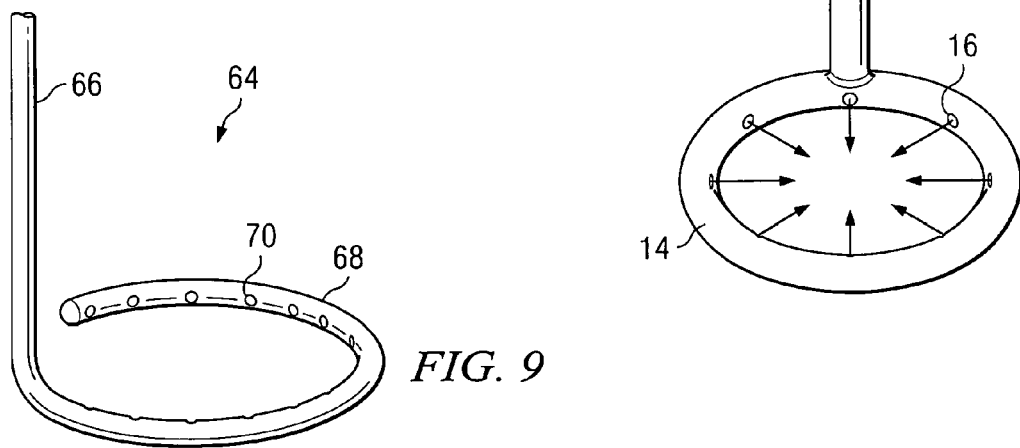
*FIG. 9*

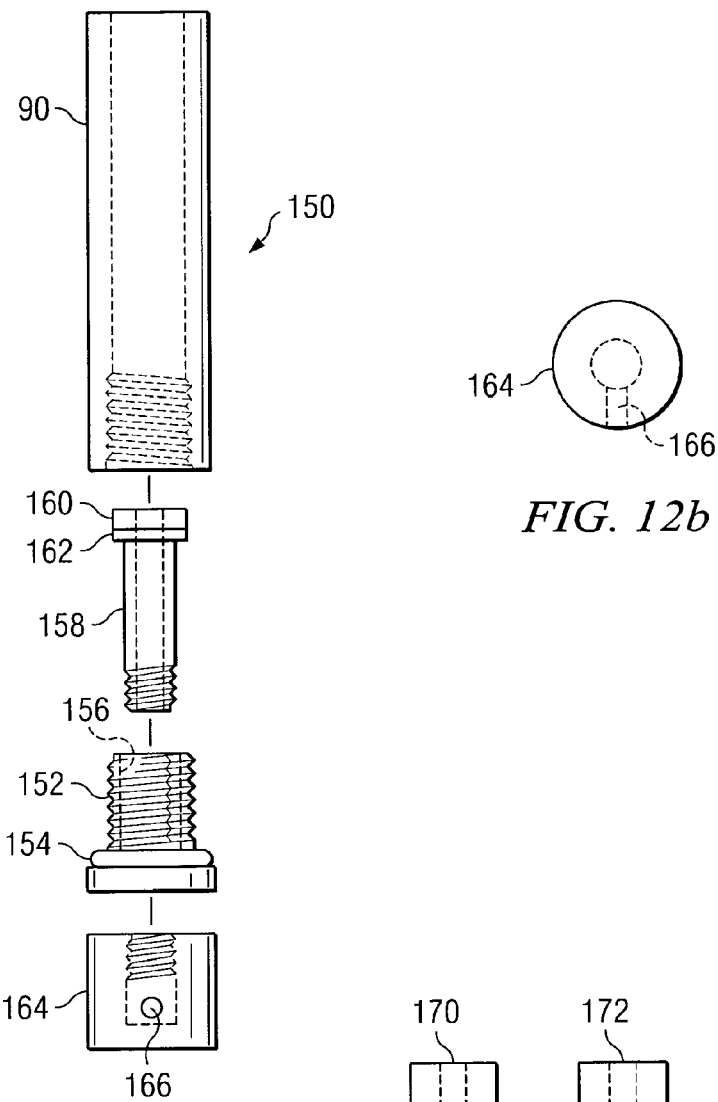
FIG. 12b
FIG. 12a
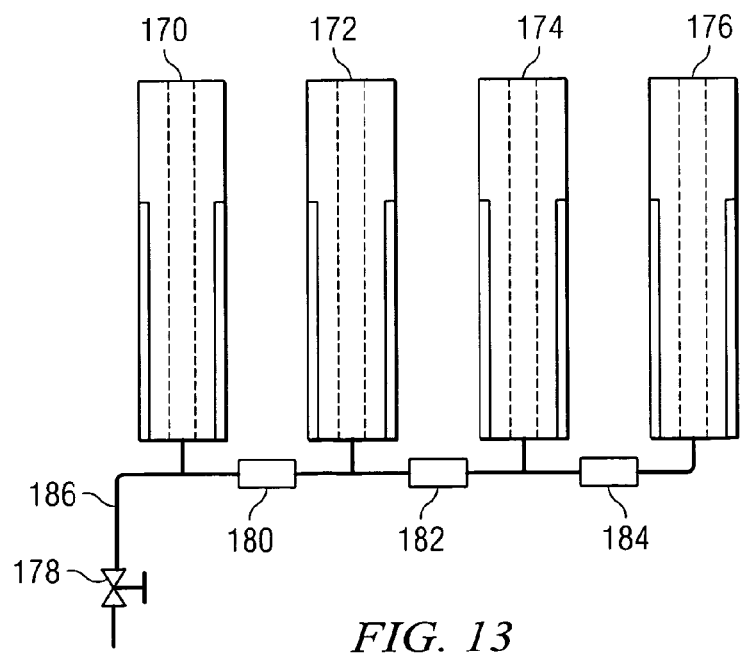
FIG. 13

RADIAL FLOW FILTER WITH TRAVELING SPRAY DEVICE

RELATED PATENT APPLICATION

This non-provisional patent application claims the benefit of U.S. Provisional Patent Application Ser. No. 61/068,715, by John D. Martin, filed Mar. 10, 2008.

TECHNICAL FIELD OF THE INVENTION

The present invention relates in general to particulate filters, and more particularly to the cleaning of residue from the filter surfaces.

BACKGROUND OF THE INVENTION

There exist many types of filters for removing particulate matter from an influent. Such filters are generally classified as the type having either a bonded media or a nonbonded media. A filter that employs a bonded media generally includes either a removable cartridge element constructed of a fibrous woven or nonwoven material, or includes a membrane that has very fine pore size openings.

Another family of filters employs a nonbonded media, which are basically of two types. The conventional nonbonded granular type filter is well known, and a much newer radial flow filter using a nonbonded media is described in U.S. Pat. Nos. 6,322,704; 6,852,232; 7,163,621 and 7,470,372, all by Martin.

Eventually the filters employing either a bonded or nonbonded medium become plugged with contaminants and must be cleaned or replaced. The replacement of the filter elements is effective to restore the filter operation, but can be expensive and time consuming.

In the case of a nonbonded media filter, the media itself can be regenerated through either fluidization to purge the granules or beads of particulate matter accumulated in the interstices of the media. However, and most importantly, the retaining screens that contain the nonbonded media can also become plugged over time and need to be cleaned, as the fluidization process does not always clean the screens sufficiently. Therefore, over time the screens must either be replaced or disassembled and cleaned. An expensive alternative is to replace the retaining screens with new, clean retaining screens, although this is expensive and time consuming.

In the case of conventional bonded cartridge type filters, the cartridge must be manually cleaned or replaced after a period of operation. The cleaning of the cartridge of a filter generally involves removal of the cartridge, and manually spraying the outer surface to remove the residue collected thereon.

From the foregoing, it can be seen that a need exists for a method and apparatus to cleanse a radial-flow filter, whether it be the conventional cartridge or the newer nonbonded type. In the case of the conventional cartridge or the generic filter screen, the life can be extended, often dramatically, by eliminating the filter cake buildup on the inside or outside of the filter. In the case of a filter employing a nonbonded filter medium, the filter medium itself can be regenerated by a fluidizing operation, but the buildup on either the outside or inside retaining screens can become clogged with residue which requires removal to restore the operation of the entire filter.

SUMMARY OF THE INVENTION

In accordance with the principles and concepts of the invention, disclosed is a spray device adapted for movement along a filter surface to emit a jet of cleaning fluid to remove residue from the filter surface.

According to a preferred embodiment of the invention, a spray cycle is initiated when the filter material becomes clogged with contaminants. A pressurized fluid source is coupled to the spray device to produce a spraying effect, as well as to move the spray device along the surface of the filter. The spraying device is transported to those areas of the filter clogged by contaminants to release the same and restore the filter to its original condition.

The transport of the spray device can be accomplished through various means, including manual, mechanical, hydraulic and others. The degree of cleaning is largely controlled by the velocity of the spray, its mass, the distance to impact, and the inertia of the medium through with the spray stream travels, among other parameters.

In accordance with one preferred embodiment of the invention, a halo is employed with a series of orifices or nozzles. The halo encircles the filter element to be cleaned and allows for the spray to be directed to the residue-covered surface. The halo is then transported axially up and down the length of the filter to expose the entirety of the clogged surfaces to the spray jetted from the halo. Preferably, the spray device remains in the filter, even during normal filter operations.

The spray cleaning operation can be maximized by allowing the fluid and pressure in the filter to be removed before the spray cycle is initiated. This preconditioning of the filter minimizes the inertia of the medium through which the spray device is transported and also maximizes the impact of the spray stream on the surface to be cleaned.

The spray device also can be utilized with radial flow fluidizable filters to facilitate fluidizing of the media granules.

Another embodiment utilizes a spray nozzle in place of, or in addition to the halo. This allows for the pressurized fluid to be introduced to the spray device that travels down the centerline of the filter and allow one or more orifices or nozzles to spray the area of interest. Both a spray nozzle head and a halo can be used in a filter to clean the inner cylindrical surface and outer cylindrical surfaces.

In other embodiments, the nozzle and or spray halo can be used to clean a filter screen wrapped around a perforated cylinder, without any granular media present. In this type of filter, the filtration or separation process uses the screen for the sole purpose of removing particulate matter from the influent. When the filter screen becomes clogged, it is cleaned by the halo device and or the nozzle device of the invention to purge contaminates and return the filter screen substantially to its original condition.

In another embodiment of the invention, hydraulics can be utilized to maximize the spraying and fluidizing effect and minimize the required pressure.

In another embodiment of the invention, pressurized air can be used to accentuate the impact of the spraying and travel to facilitate removal of residue from a surface.

In all embodiments, various advantages are achieved through the use of the concepts of the invention by the proximity of the nozzles to the point of contact, the velocity of the spray stream, mass of contacting fluid and inertial restraints of the medium through which the spray stream travels.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or components throughout the views, and to which:

FIG. 8a is a cross-sectional view of a hydraulic-actuated spray halo device of one embodiment of the invention, where the stem and spray halo are shown in a retracted position;

FIG. 8b is a cross-sectional view of the spray halo device of FIG. 8a, with the stem and the spray halo shown in an extended position;

FIG. 9 is a view of a spray halo constructed according to another embodiment of the invention;

FIGS. 12a and 12b illustrate a nozzle head that is rotatable in response to a pressurized liquid applied thereto; and FIG. 13 illustrates a number of radial flow fluidizable filters arranged to optimize the fluidization process.

DETAILED DESCRIPTION OF THE INVENTION

Reference is made to U.S. Pat. No. 6,322,704 by Martin, the "Martin patent," for a complete discussion of the structure and operation of a radial flow fluidizable filter employing a nonbonded media. The Martin patent is referenced to herein for its structure and adaptation to provide fluidization of a nonbonded media in a radial flow filter. The complete disclosure of the Martin patent is incorporated herein by reference thereto.

Figure 1:
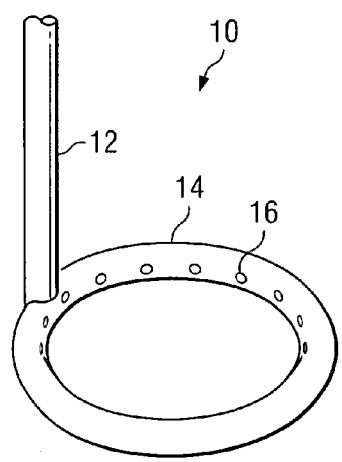
FIG. 1 illustrates a spray halo device according to an embodiment of the invention.

FIG. 1 illustrates in generalized form a traveling spray device 10 constructed in accordance with one embodiment of the invention. The device includes a spray halo 10 constructed with a tubular stem 12 connected to a spray member comprising an annular-shaped tubular halo 14. The tubular halo 14 is constructed with a number of nozzles 16 or orifices in a location so as to be directed generally radially inwardly. The pressurized liquid that is fed down the stem 12 flows into the tubular halo 14 and is thus jetted out of the nozzles 16. The pressurized fluid enters the top of the stem 12 and is transported down the stem to the tubular halo 14 where it is distributed equally to both sides to distribute the pressurized fluid equally between the separate orifices 16 formed in the tubular halo 14. It has been found that if the fluid is introduced in another manner, the resulting spray may not be uniform, and could impede the effectiveness of the spray as some portions of the filter would be exposed to much higher forces while other portions are not. It can be appreciated that since there are nozzles 16 spaced all the way around the inner surface of the halo 14, the jet streams are directed from every direction inwardly. The higher the pressure of the liquid directed down the stem 12, the more effective the jetting action. While only a single stem 12 is illustrated, more than a single stem connected to the tubular halo 14 can be employed. Alternatively, more than one halo 14 can be connected to the same stem 12 so that the stem 12 need only move half the distance to remove residue from the full filter surface. In other words, a top halo can move downwardly from the top of the filter surface to about half way down, and a lower halo can move from the middle of the filter surface to the bottom thereof. In any event, the spray halo 10 can be inserted into a filter container so that a part of the stem 12 extends outside of the filter container and can be connected to a source of pressurized fluid. The exposed portion of the stem 12 can then be manually moved in an axial direction to allow the halo 14 to clean filtered residue from the filter surfaces. The stem 12 would be sealed to the filter case so that influent would not escape from the filter container during the normal filtering operation. Indeed, the top cap of the filter could have a threaded stub through which the stem 12 protruded sufficiently so as to be able to grasp. When not in use, a threaded cap could cap the stub and seal the stem 12 therein. As will be described below, the movement of the spray halo 10 can also be accomplished automatically in response to the application of the pressurized liquid to the spray halo 10.

Figure 2A:
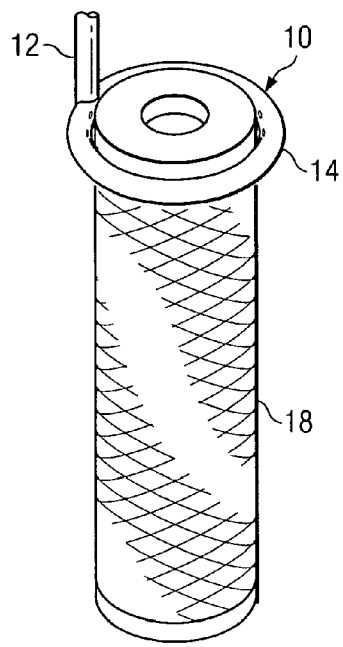
FIGS. 2a and 2b are respective frontal views of a conventional cartridge filter being cleaned with a traveling spray halo.
Figure 2B:
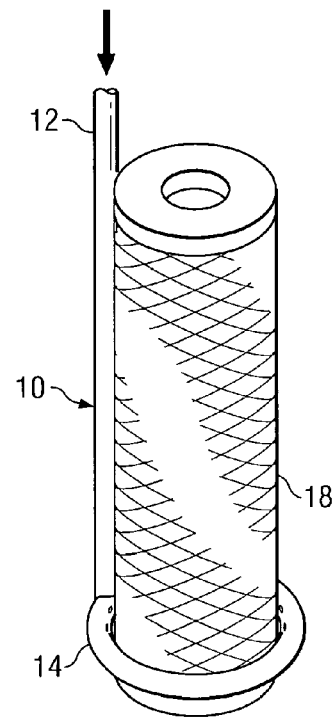

FIG. 2a illustrates the spray halo 10 operating with a conventional filter cartridge 18 of the bonded type. The spray halo 10 is shown in a rest position around the cylindrical surface of the filter cartridge 18, when the spray halo 10 is not in use. While not shown, the filter cartridge 18 and the spray halo 10 are housed within a housing or case, not shown for purposes of clarity. As noted above, during the filtration phase, particulate matter accumulates on the outer surface of such type of filter, and after a period of time, the accumulated particulate matter becomes caked on the outer surface of the cartridge 18 and reduces the effectiveness thereof. The cartridge 18 is surrounded by the tubular halo 14, and the entire spray halo 10 is adapted to travel the vertical length of the cartridge 18 during a spray cycle, shown in FIG. 2b. While not shown, the stem 12 of the spray halo 10 can be telescopically moved within a tubular sleeve. The movement of the spray halo 10 can be carried out manually or, as will be described in more detail below, the spray halo 10 is caused to move downwardly in response to a pressurized liquid forced into the stem 12. As the tubular halo 14 travels downwardly in close proximity to the outer surface of the filter cartridge 18, the spray nozzles 16 come into alignment with the contaminated surfaces of the cartridge 18 and by means of the velocity and mass of the fluid stream generated by the spray halo 10, the particulate matter accumulated on the outer surface of the cartridge 18 is removed and the cartridge 18 is thereby cleaned.

Figure 3A:
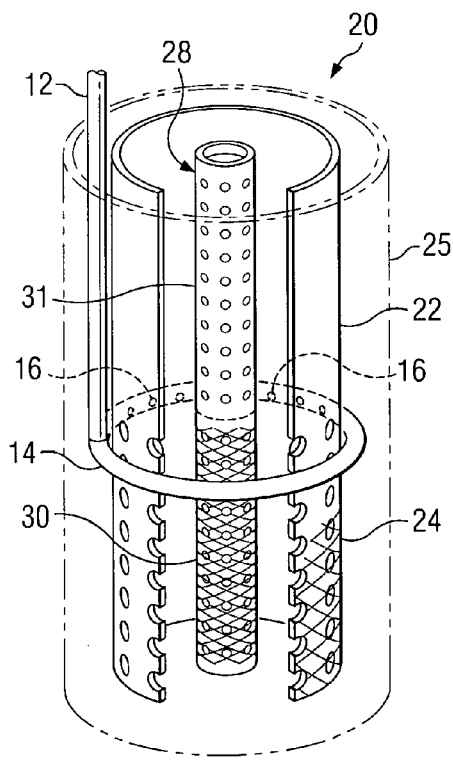
FIGS. 3a and 3b are partial cross-sectional views of a radial flow fluidizable filter equipped with a traveling spray halo, and illustrating the travel path of the spray halo.
Figure 3B:
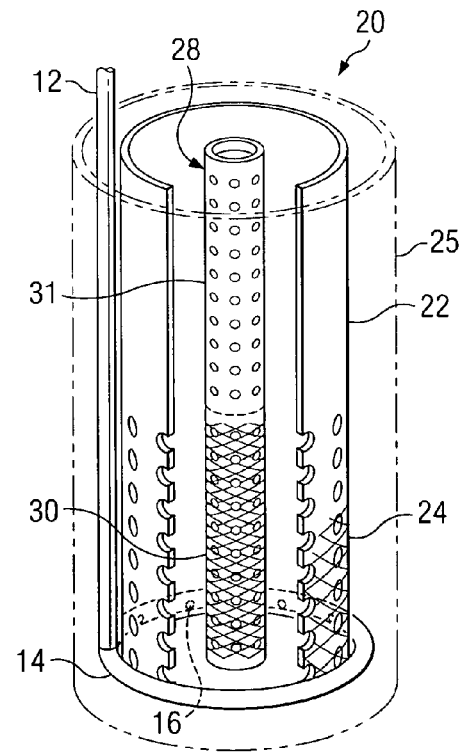

FIGS. 3a and 3b illustrate the use of the spray halo 10 in conjunction with the radial flow filter 20 of the Martin patent identified above. A cylindrical case 25 encloses the entire radial flow filter 20. A top and bottom end cap to the filter 20 is not shown. The radial flow filter 20 includes an outer cylindrical member 22 that is constructed with a perforated bottom portion 24. The inner surface of the perforated portion 24 of the outer cylinder 22 is covered with a mesh screen to contain the nonbonded media. The upper nonperforated portion of the outer cylinder 22 defines a backwash chamber. Located concentrically within the outer cylinder 22 is an inner cylinder 28 that also includes a bottom perforated portion 30 and a top perforated portion 31. The bottom perforated portion 30 and the top perforated portion 31 are separated internally by a plug (not shown). The outer surface of the bottom perforated portion 30 of the inner cylinder 28 is also covered with a mesh screen to contain the nonbonded media between the outer perforated cylinder 24 and the inner perforated cylinder 30. During a filtration cycle, the influent is directed radially inwardly through the perforated portion 24 of the outer cylinder 22, then radially through the nonbonded media (not shown) and into the perforated portion 30 of the inner cylinder 28 as filtered liquid.

The spray halo 10 is shown in FIG. 3a in a rest position near the top of the perforated portion 24 of the outer cylinder 22. Again, the spray halo 10 surrounds the outer perforated cylinder 22. The nozzles 16 are directed inwardly to allow jets of pressurized liquid to be directed to the screen-covered perforations of the outer perforated cylinder 24. Optionally, there can be nozzles formed on the outside periphery of the tubular halo 14 so that other jets of pressurized liquid can be directed to the inner cylindrical sidewall of the case 25.

As the radial flow filter 20 becomes clogged with contaminants, shown by an increase in pressure of the influent, a spray cycle can be initiated whereby the flow of influent is interrupted and any residual liquid is removed from the filter 20 through an outlet in the bottom of the filter 20. Then, a spray fluid is introduced into the stem 12 of the spray halo 10 and forced through the nozzles 16 of the halo 14 onto the outside surface of the outer perforated cylinder 24. In one embodiment, the force of the incoming spray fluid to the halo 10 also forces the spray halo 10 to travel downwardly along the face of the outside surface of the outer perforated cylinder 24, exposing the entire filter face to the force of the halo spray. At the end of the spray cycle when pressure is removed from the spray halo 10, it is returned to its original position shown in FIG. 3a, or at either the top or the bottom of the filter 20. The spray cycle can be carried out either by itself or in conjunction with a backwash or fluidization cycle in which the nonbonded media between the inner perforated cylinder 30 and the outer perforated cylinder 24 is carried to the top of the filter 20 and fluidized with a backwash fluid to remove the particulate matter that accumulated in the interstices of the beads of the nonbonded medium.

When the spray cycle is used independently of a fluidization cycle, the spray cycle can be employed to prolong the time between backwash cycles where the media is actually fluidized and purged of particulate matter. By initiating a spray cycle when the particulate matter becomes caked on the outside of the filter surface, which causes an unacceptable amount of pressure drop across the filter, the pressure drop can be restored to an acceptable amount after the spray cycle, and the filter can be returned to the filter cycle without having to proceed to a full backwash cycle. This saves time and backwash fluid. After one or more of spray cycles, a timer or counter can be set to initiate a full backwash or fluidization of the radial flow filter 20 when the time between spray cycles becomes too short. In this manner, both the amount of backwash water utilized and the amount of energy to operate the pumps can be minimized.

The incoming fluid to the spray halo 10 can include any number of different fluids or chemicals, including air. It has been found that by adding short bursts of pressurized air down the stem 12 with the pressurized liquid, the impact of the spray jet can be greatly enhanced. This occurs for the very reason that the velocity of the air in conjunction with the mass of the water or other fluid being sprayed out of the nozzles 16 maximizes the impact of the spray onto the caked filter residue.

Figure 6A:
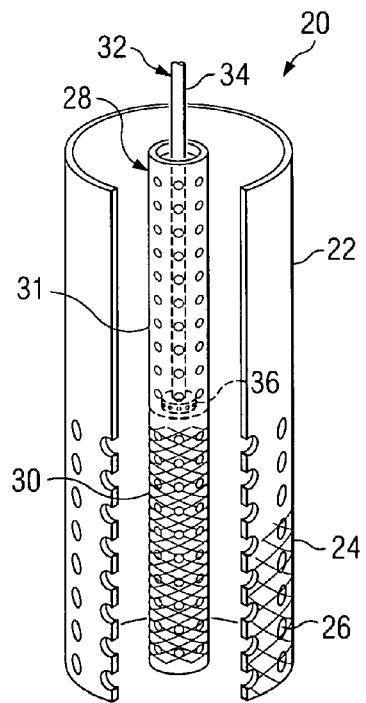
FIGS. 6a and 6b are partial cross-sectional views of a radial flow fluidizable filter equipped with a traveling spray nozzle, and illustrating the travel path of the spray nozzle.
Figure 6B:
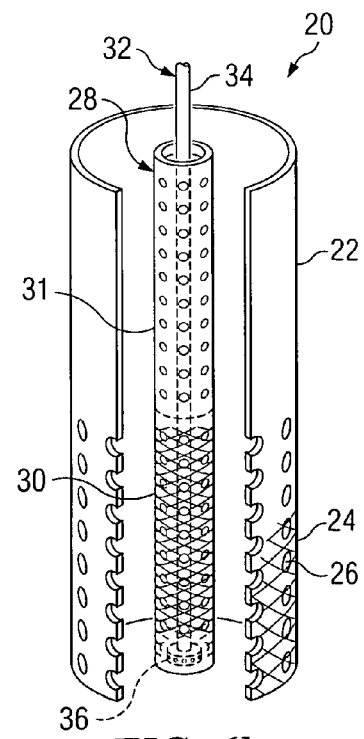
Figure 7:
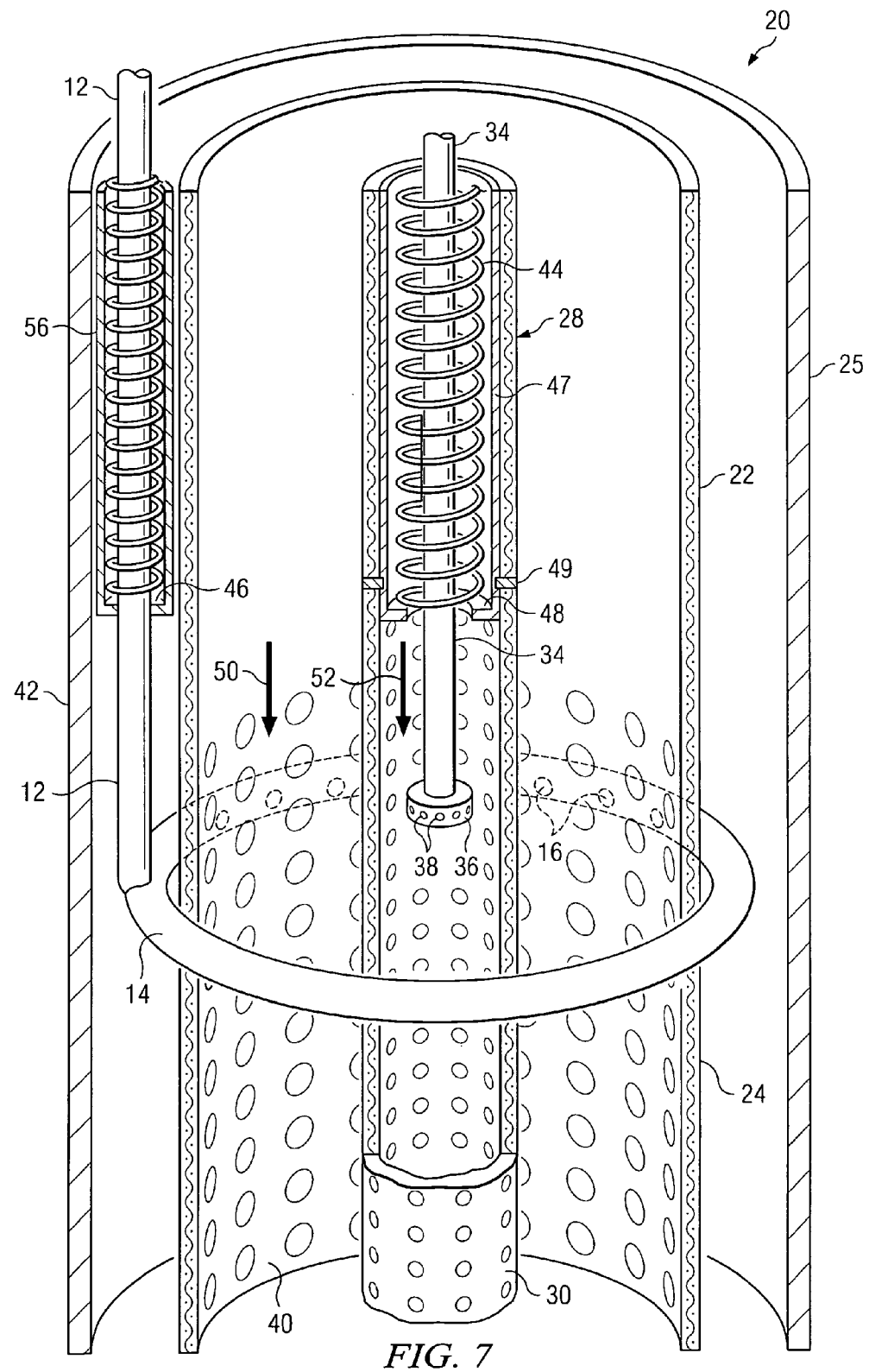
FIG. 7 is a cross-sectional view of one embodiment of a radial flow fluidizable filter provided with both the spray halo device and a spray nozzle device.

When the spray halo 10 is used in conjunction with the fluidization cycle, it not only can clean off the outside filter screen but can also work in unison with the inside orifices or nozzle. As described in detail in the Martin patent, the inside cylinder orifices promote the sectional fluidization of the media from the top down. As shown in FIGS. 6a, 6b and 7 of the Martin patent, the velocity vectors can be greatly enhanced in the axial direction by the addition of this outside spray.

Figure 4:
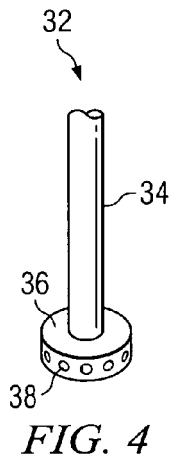
FIG. 4 illustrates a spray device comprising a nozzle head connected to a tubular stem.
Figure 5A:
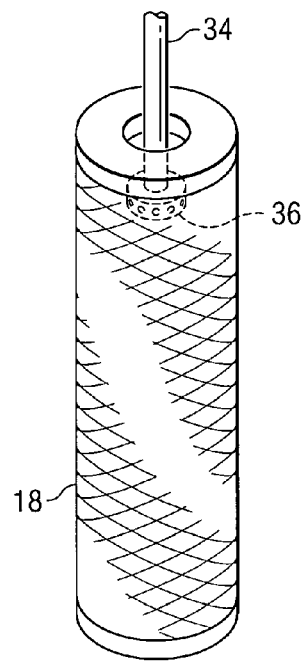
FIGS. 5a and 5b are respective frontal views of a conventional cartridge filter being cleaned with a spray head.
Figure 5B:
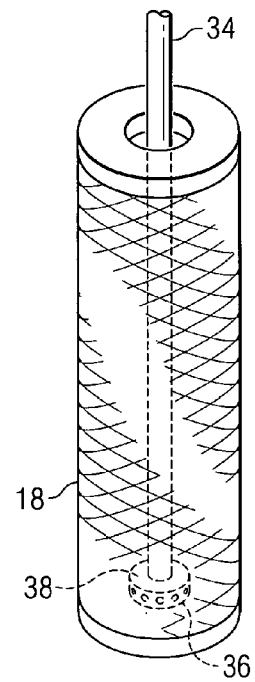

FIG. 4 illustrates in a generalized diagrammatic form, a spray device that includes a traveling spray nozzle 32 constructed in accordance with another embodiment of the invention. The traveling nozzle 32 is constructed with a tubular stem 34 connected to a spray member comprising a nozzle head 36 having plural nozzles 38 formed therein. In one embodiment the nozzles 38 are formed all around the nozzle head 36 to provide streams of pressurized fluid outwardly in all directions. In another embodiment, there is formed in the nozzle head 36 one nozzle 38, but the nozzle head 36 is connected to a mechanism that causes rotation of the nozzle head 36 with respect to the stem 34, when pressure is applied to the stem 34. The rotation mechanism can be much like the mechanism that rotates a lawn sprinkler when water is applied thereto. With a single nozzle 38, a greater force can be applied by the jetted stream to thereby more effectively remove residue from the filter surface. The traveling nozzle 32 of FIG. 4 can operate in conjunction with a conventional filter cartridge 18, shown in FIGS. 5a and 5b. The spray nozzle 32 is placed inside the cartridge 18 or bag filter and a pressurized fluid is introduced into the top of the stem 34 to initiate the travel and spray of the nozzles 38 along the length of the inner core of the filter cartridge 18. When fully extended, the nozzle head 36 extends down to the bottom of the inner core of the cartridge filter 18, as shown in FIG. 5b. In this manner, the entire inner and/or outer surface of the cartridge 18 can be exposed to the spray and cleaned. While not shown, the stem 12 of the spray nozzle 32 can be telescopically moved within a tubular sleeve. Again, as with the traveling spray halo 10, pressurized air can be introduced into the liquid stream to intensify the force of the spray jetted from the nozzles 38.

FIGS. 6a and 6b illustrates the use of the traveling spray nozzle 32 in conjunction with the radial flow filter described in the Martin patent identified above. As the filter 20 becomes clogged with contaminants, the backwash or fluidization cycle can be initiated, whereby fluid is introduced into the stem 34 of the traveling spray nozzle 32 and forced out through the nozzles 38 onto the inside surface of the inner perforated cylinder screen 30. The force of the incoming spray fluid coupled to the traveling nozzle 32 forces it to travel down the length of the inner perforated cylinder 30, exposing the filter media to the force of the spray nozzle 32. At the end of the spray cycle the traveling nozzle 32 returns to its original position which can be at either the top or the bottom of the radial flow filter 20.

In addition to the fluidization, the traveling spray nozzle 32 can also be used to clean both the inner and outer cylinder screens. In this case, once all the media has been fluidized into the top backwash chamber, the traveling spray nozzle 32 travels back up the inside cylinder with the spray streams now unencumbered by the media which has been transferred to the top of the fluidization chamber. This allows the spray to directly reach the inside of the outside filter screen. The net effect is much the same as the outside spray halo in purging the outer screen of contaminants. The traveling spray nozzle 32 can be cycled up and down several times while the media is at the top to assure the filter surface is purged of residue.

Furthermore, the incoming spray fluid to the traveling spray nozzle 32 can consist of any number of different fluids and chemicals, including air. It has been found by adding short bursts of pressurized air the impact of the traveling spray nozzle 32 can be greatly enhanced. This occurs for the very reason that the velocity of the air in conjunction with the mass of the water or other fluid being used maximizes the impact of the spray.

By use of the spray halo 10 or the traveling spray nozzle 32 in place of the inside cylinder orifices or check valve of the Martin patent, sectional fluidization can be taken to its ultimate. The traveling spray nozzle 32 enables the nonbonded medium (beads) to be fluidized from the top down as with the case with the fluidization orifice. However, this fluidization can be carried out on almost a row by row basis of filter media versus the section by section basis of the fluidization described in the Martin patent. This allows for a much more efficient fluidization as all of the incoming fluid is directed to the top layer on down as the nozzle travels from the top down. Obviously, with all the fluid being directed to the area of interest, very little is wasted as with the fluidization orifices where all the incoming fluid must be equally distributed between all sections in the filter 20. Therefore, heavier or dirtier filter media can be fluidized, while at the same time allowing for a much more aggressive separation of the beads of the filter media.

In addition to the foregoing, to ensure more fluidization forces are being generated, the traveling spray nozzle 32 also functions to spray off both the inner and outer cylindrical screens as well as the filter media, as much of the filter media is then exposed to the force from the spray nozzle 32. This can be particularly helpful where the filter media becomes encrusted with trapped particles or chemical additives such as polymers.

FIG. 7 illustrates a cross-sectional view of a radial-flow filter 20 incorporating many of the aspects and features described above. Specifically, both the spray halo device 10 and traveling spray nozzle device 32 are incorporated into the radial flow filter 20 to maximize the filter run time and regeneration capabilities. The spray halo 10 and traveling spray nozzle 32 can be operated in unison to maximize the fluidization forces on the media while the spray halo 10 can be used independently to extend the times between full backwash cycles or fluidization. In general, and to be described in more detail below, when in a rest state, respective springs maintain the spray devices 10 and 32 in retracted positions at the top of the filter 20. However, when both spray devices 10 and 32 are connected to a source of pressurized liquid, they are extended downwardly (shown by respective arrows 50 and 52) against the force of the respective springs 42 and 44 to thereby spray pressurized liquid onto filtered residue to remove the same from the filter members. The coil spring 42 surrounds the stem 12 of the spray halo 10, and the coil spring 44 surrounds the stem 34 of the traveling spray nozzle 32. A spring stop 46 on the end of the sleeve 56 functions to prevent the bottom end of the coil spring 42 from moving, and a spring stop 48 on the bottom of the sleeve 47 prevents the bottom end of spring 44 from moving. In practice, a plug 49, comprising a washer, is located between the inner perforated cylinder 28 and the sleeve 47 at a location just above the stop 48. The plug 49 prevents the flow of backwash liquid forced upwardly in the inner cylinder 28 from flowing into an upper portion of the inner perforated cylinder 28. The plug 49 separates the top portion of the inner cylinder 82 from the bottom portion. While not shown, the top structures of the spray devices 10 and 32 have members that capture the tops of the springs 42 and 44, and as the respective stems 12 and 34 move downwardly under the force of the pressurized liquid, the springs 42 and 44 are compressed. When the liquid pressure is removed from the respective stems 12 and 34, the springs 42 and 44 return the spray devices 10 and 32 to the respective upward rest positions. A top filter case end cap (not shown) can be employed to support the top of the inner cylinder 28, the outer cylinder 22 and both of the spray devices 10 and 32. A bottom filter case end cap (not shown) can be employed to support the bottom ends of the inner cylinder 28 and the outer cylinder 22. Moreover, the top and bottom end caps can support a cylindrical case 25.

In particular, when a pressurized fluid is applied to the top ends of the spray devices 10 and 32, the force of the liquid pushes the respective stems 12 and 34 downwardly, thus moving the respective tubular halo 14 and the nozzle head 36 downwardly. It should be noted that the pressurized liquid is also coupled to the stems 12 and 34 and sprayed out of the respective nozzles 16 and 38. In this embodiment, the nozzles 16 of the tubular halo 14 are formed on the inner periphery thereof and thus direct the jets of pressurized liquid radially inwardly, or at a slight downward or upward angle. In this manner, the portion of the mesh screen exposed through the perforations of the outer perforated cylinder 24 are purged of filtered residue. The residue is washed to the bottom of the filter 20. In like manner, the downward movement of the traveling nozzle 32 causes jets of pressurized liquid to be jetted radially outward, or at a similar downward or upward angle, to remove the residue collected on the outside of the inner perforated cylinder 30, as well as from both sides of the outer perforated cylinder 24. The residue removed by both of the spray devices 10 and 32 falls to the bottom of the outside annular, outside the outer perforated cylinder 24, as well as to the bottom of the media chamber, noted by numeral 40. The residue that falls to the bottom of the media chamber 40 can be removed from the filter during a fluidization or backwash cycle.

FIGS. 8a and 8b illustrates a hydraulic actuator to automatically propel the travel of the spray halo 10, as an alternative to manual activation. A tubular sleeve 56 houses the coil spring 42 and the stem 12. The spring stop 46 is constructed at the lower end of the sleeve 56. The top of the stem 12 includes a flange 58. The flange 58 is fastened to the top of the stem 12 after the spring 42 has been slipped over the stem 12. The flange 58 functions as a top stop for the top of the coil spring 42. The flange 58 also functions to provide a surface area against which pressurized fluid can act to force the stem 12 downwardly. A cap 60 is fastened to the top of the sleeve 56. The cap 60 can be threaded, bonded or otherwise fastened to the top of the sleeve 56. The cap 60 is constructed with a fluid inlet 62 for mating with a source of pressurized fluid, not shown. Again, the fluid inlet 62 of the cap 60 can be threaded, as shown, or adapted for connection to an elastomeric hose or metal or plastic pipes.

In operation, the pressurized fluid enters through the cap 60 at the top of the spray device 10 and exerts a pressure on the flange 58 of the stem 12. The fluid pressure forces the stem 12 downwardly against the spring force, and as the fluid flow increases the pressure on the stem 12 also increases, thereby pushing down on the flange 58 of stem 12 and moving the spray halo 10 downwardly. It can be appreciated that during the downward movement of the spray halo 10, the spring 42 becomes compressed. FIG. 8a illustrates the spray halo 10 at the starting position, while FIG. 8b illustrates the spray halo 10 at full travel.

It should be noted that in this embodiment, a clearance exists between the annular edge of the flange 58 and the inner cylindrical surface of the sleeve 56. The clearance prevents wedging between the surfaces and allows for unencumbered travel of the stem 12 down the sleeve 56 while still providing ample fluid resistance to produce the necessary force for causing downward movement of the spray halo 10. This clearance also provides for sufficient fluid flow and resistance to produce sufficiently high fluid velocities to prevent any contaminants from accumulating and interfering with the travel of the stem 12.

Once the incoming fluid flow rate is reduced, or removed by a valve, the downward force on the stem flange 58 is reduced. As a result, the force of the spring 42 dominates, in which event the stem 12 and the tubular halo 14 are telescopically retracted back into the sleeve 56. As can be appreciated, the spring 42 can be of the appropriate compression strength (foot pounds) to provide the necessary resistance for both travel and generation of sufficient velocities at each nozzle or orifice 16 in the tubular halo 14. Lastly, along with the compression strength of the spring 42, a certain preload can be incorporated to provide for both the necessary initial spraying force as well as allow for the required travel. The optimum design is for the entire filter surface to be exposed to approximately the same forces from the spray so that the entire filter surface is cleaned, rather than only a portion thereof. Proper spring design and preload can determine by those skilled in the art to produce the desired result.

It should be noted that the traveling spray nozzle 32 can be mounted in the sleeve 56 and associated apparatus of FIGS. 8a and 8b to allow a pressurized fluid to be coupled thereto and move the nozzle head 36 downwardly while at the same time directing spray jets outwardly to clean a filter surface. It should also be appreciated that the stem 34 of the traveling nozzle 32 can be equipped with spiral grooves or spiral ridges, and the sleeve 56 can be equipped with mating spiral ridges or spiral groves, so that during the downward travel of the stem 34, it rotates. One revolution per travel path can facilitate removal of the filtered residue.

FIG. 9 illustrates another embodiment of a spray halo 64. The simplified design includes a tubular stem 66 made integral with the tubular halo 68. Nozzles 70 are formed in the halo 68. The spray halo 64 can be constructed of a single length of tubular material, and forming the same into the desired shape. This alleviates the process of using a splice or other wise joining two different components of the spray halo 64 together.

Figure 10:
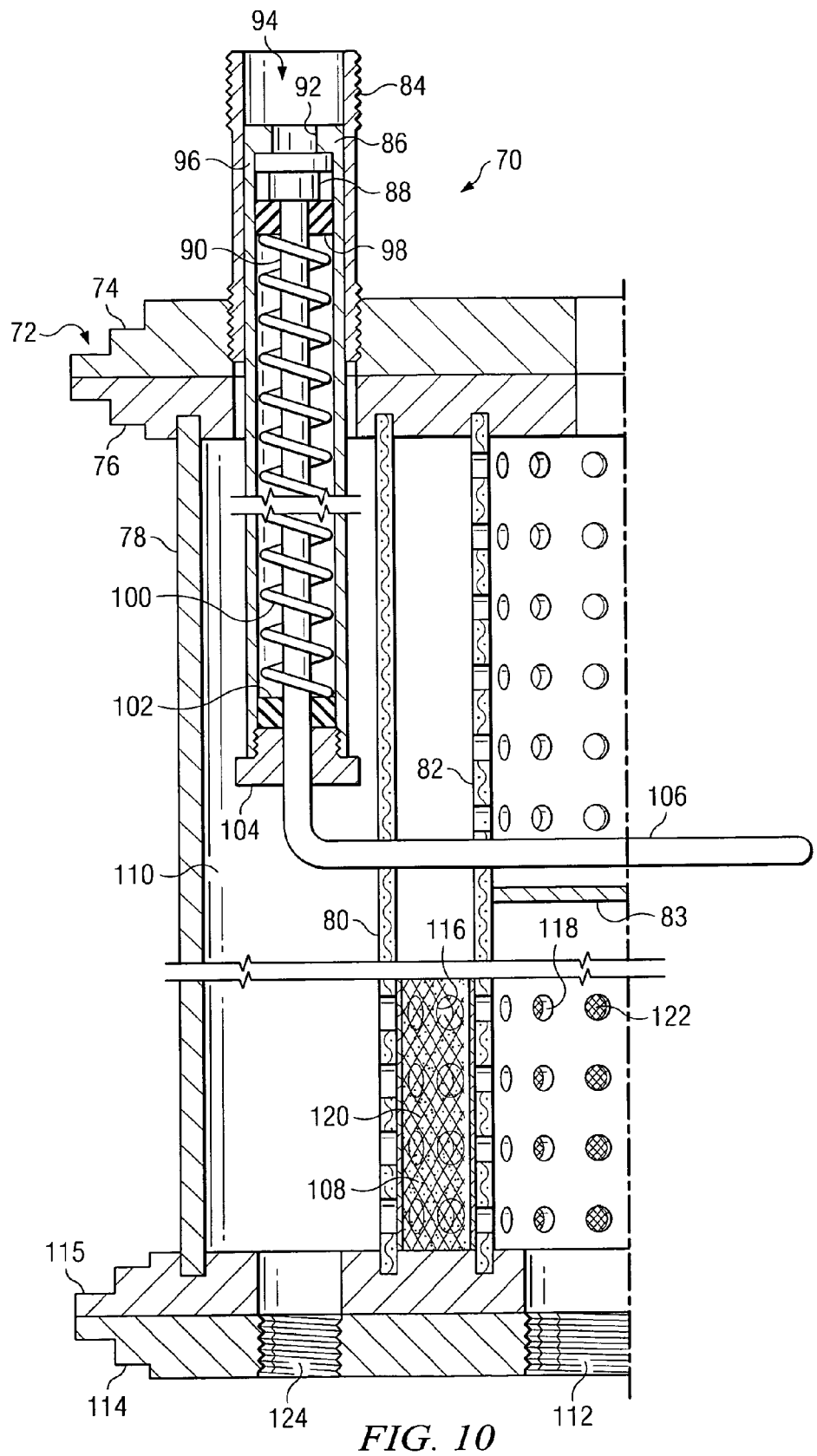
FIG. 10 is a partial cross-sectional view of a radial flow fluidizable filter incorporating another embodiment of a spray halo device therein.

FIG. 10 illustrates yet another embodiment of the spray halo 70 constructed according to the invention. The spray halo 70 is illustrated attached to a top end cap arrangement 72. The top end cap arrangement 72 of the filter includes a first part 74 that is removable from the filter, and a bottom part 76 that is attached to the filter. Only a left, top portion of the filter is illustrated in FIG. 10, it being understood that the filter itself is not a necessary part of the invention, as the spray halo 70 can be used in many other applications. A pair of conventional flanges, not shown, are used to clamp the top end cap parts 74 and 76 together and the bottom end cap parts 114 and 115 together. The bottom part 76 of the top end cap 72 is formed with different diameter recesses to accommodate the circular ends of the respective cylindrical elements, including the case 78, the outer perforated cylinder 80 and the inner perforated cylinder 82. The seals are not shown for purposes of clarity. The inner cylinder 82 is perforated through it entire length, but has a plug 83 in the central part to divide the filter into a bottom filtration section and a top fluidization section. When a backwash liquid is applied to the bottom port 112, the fluid is directed radially outwardly into the nonbonded media 108 which forces it upwardly in a fluidized state. The beads of the media 108 are separated so that the particulate matter can flow with the backwash fluid into the upper perforated portion of the inner cylinder 82 and out of the top port 113.

The spray halo 70 is fastened to the top part 74 of the top end cap 72. A nipple 84 that is threaded at both ends anchors the spray halo 70 to the end cap part 74. An annular stop 86 is fastened in the nipple 84 against which the top 88 of the stem 90 of the spray halo 70 abuts when in a rest position. The stem assembly 90 is not shown in cross section, but is hollow to carry pressurized liquid therethrough. To that end, the stop 86 also has a central bore 92 formed therethrough to allow the passage of pressurized fluid in the direction of the arrow 94. A tubular sleeve 96 is held within the nipple 84. As described above in connection with other embodiments of the spray halo, the stem 90 telescopically moves in the sleeve 96 in response to the force of the pressurized fluid coupled to the nipple 84. While not shown, a manual or electrically-controlled valve can be connected to the nipple 84 to control when a spray cycle is to be carried out.

The stem assembly 90 includes an enlarged top 88 which abuts against the stop 86. A Teflon bushing 98 encircles the narrowed portion of the tubular stem 90 and functions to provide easy and trouble-free sliding of the stem assembly 90 within the sleeve 96. The coil spring 100 encircles the tubular stem 90, with the top end thereof engaged with the underside of the bushing 98. Fixed within the bottom of the sleeve 96 is a Teflon guide 102 having a bore through which the stem 90 slides during a spray cycle operation. A plug 104 is fixed within the bottom end of the sleeve 96 to retain the guide 102. The bottom end of the spring 100 engages with the upper surface of the Teflon guide 102. A tubular, annular-shaped halo 106 is attached to the bottom end of the stem 90 so that the pressurized liquid that is forced down the stem 90 is coupled to the annular halo 106. As a result, the pressurized liquid produces a number of radially inwardly directed jets onto the exterior surface of the outer perforated cylinder 80. As with the other embodiments described above, the halo 106 encircles the outer perforated cylinder 80.

As further shown in FIG. 10, the granular nonbonded filter media 108 is contained in a bottom portion of the filter, between the outer perforated cylinder 80 and the inner perforated cylinder 82. As noted above, both cylinders 80 and 82 include perforations 116 and 118 covered with respective fine mesh screens 120 and 122 to prevent the granular media 108 from passing through the large perforations 116 and 118 of both perforated cylinders 80 and 82. While not shown, the top end caps 72 include a port for the input of the influent into the annular space 110 between the case 78 and the outer perforated cylinder 80. A liquid influent passes radially through the outer perforated cylinder 80 and the granular media 108 located at the bottom of the filter, then through the inner perforated cylinder 82 as filtered liquid. The filtered liquid then passes down the inner perforated cylinder 82 and out an outlet port 112 in the bottom end cap 114 of the filter. Formed in the bottom end caps 114 and 115 is a residue port 124 to allow removal of the residue sprayed off the screen mesh 120 of the outer perforated cylinder 80. While the spray device illustrated includes a spray halo 106, a nozzle head can be employed with equal effectiveness inside the inner cylinder 82.

In operation of a spray cycle, the bottom residue port 124 of the filter is initially opened to allow the liquid to drain out of the filter. Then, a pressurized liquid is coupled to the nipple 84, whereupon a corresponding force is applied to the enlarged top 88 of the stem 90. The downward force moves the stem 90 downwardly, carrying with it the halo 106. As the halo 106 moves downwardly, the spray jetted therefrom is effective to clean the residue from that part of the screen mesh 120 that is exposed through the perforations 116 of the outer perforated cylinder 80. Preferably, the extent of the travel of the halo 106 is at least from the top of the perforated portion of the outer perforated cylinder 80 to the bottom perforated portion. The pressurized fluid can then be interrupted so that the spring 100 returns the stem 90 and associated halo 106 upwardly to the rest position, as shown. The spray cycle can be repeated several times in a single spray cycle to assure that the exposed portion of the mesh screen 120 covering the inside of the outer perforated cylinder 80 is completely cleaned. During the spray cycle, the pressurized fluid not only removes the residue from the screen 120, but also flushes the removed residue from the bottom of the annular space 110 out of the filter via the port 124. The residue port 124 is then closed, and normal operations of the filter can be resumed. As noted above, a spray cycle can be carried out several times between fluidization of the media 108, thereby extending the time between fluidization operations. As is well known, a backwash fluid can be injected into the bottom outlet 112 in a reverse direction to fluidize the media 108 by carrying it to the top of the filter. Not shown is the outlet of the backwash liquid which carries the filtered residue from the interstices of the fluidized media beads 108 and out of the top of the filter.

The spray halo 70 of FIG. 10, or the other embodiments described above, can be constructed more elongate than shown to increase the travel distance of the halo. In other words, the stem and sleeve of the spray halo can extend a foot or more above the top cap of the filter to provide a longer stem. With a longer stem, the travel thereof can be extended before the spring becomes significantly compressed. This allows the halo to easily travel from the top of the filter to the bottom thereof. This could allow for the extra length required due to the lengthened filter chamber and shortened backwash chamber.

Figure 11:
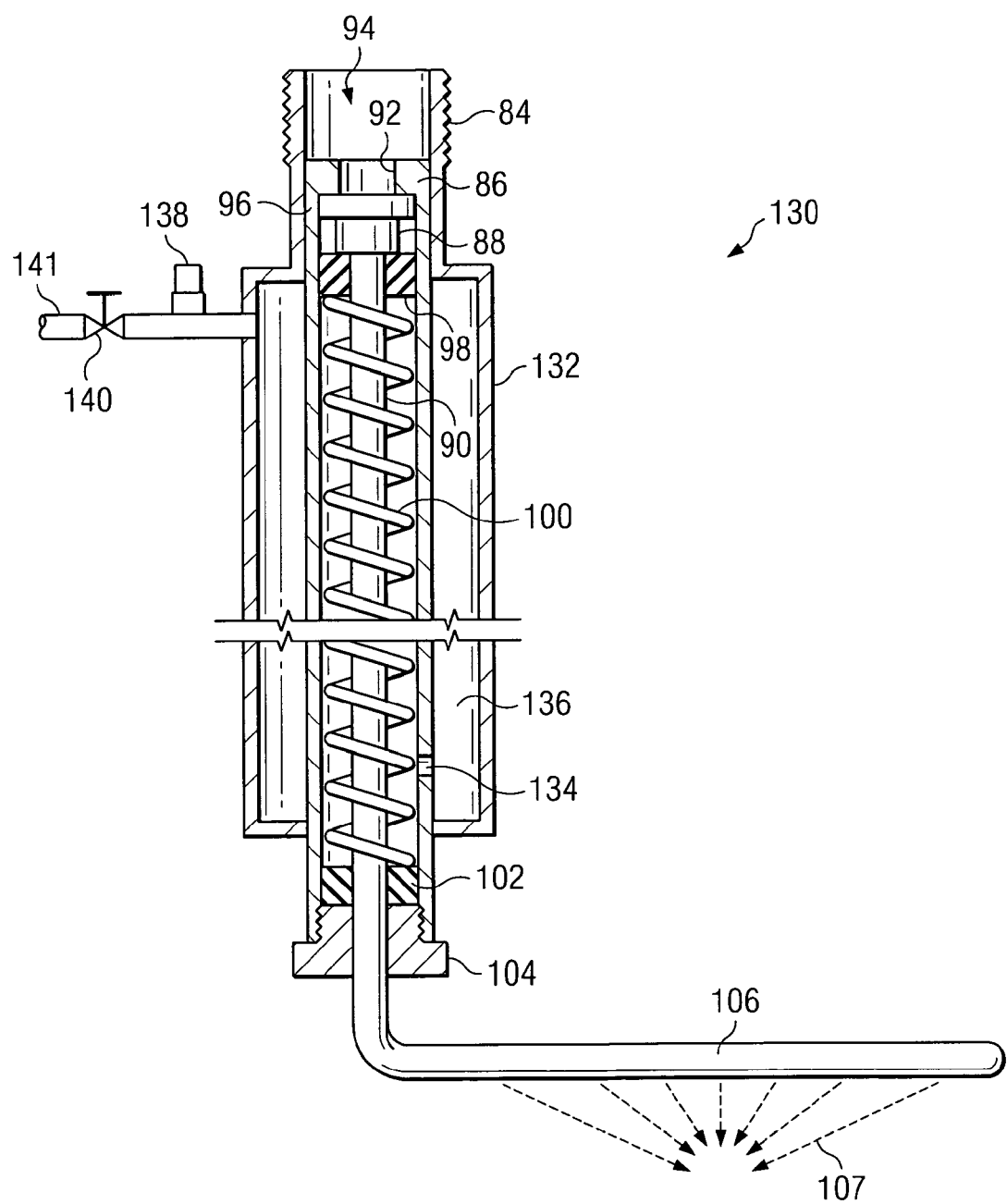
FIG. 11 is a partial cross-sectional view of another embodiment of a spray halo assembly that optimizes the spray and travel characteristics of the spray halo.

FIG. 11 illustrates another embodiment of a halo assembly 130 where hydraulics can be used with or without a spring. While a spray halo 106 is shown, the stem 90 can be equipped with a spray nozzle. The embodiment illustrates a halo assembly 130 constructed very much like that shown in FIG. 10, and with the use of a spring 100. The halo assembly 130 additionally includes a housing 132 that houses the sleeve 96 and is fastened thereto at the top and at the bottom of the sleeve 96, forming a closed chamber 136 therebetween. In addition, the sleeve 96 is modified to include one or more leakage ports, one shown by numeral 134. The leakage ports 134 allow the pressurized fluid that leaks past the top Teflon bushing 98 during operation to be passed into the closed chamber 136 in a controlled manner. As noted above, the chamber 136 is formed by the space between the sleeve 96 and the housing 132. A pressure relief valve 138 is connected to the closed chamber 136 to allow a controlled escape of fluid from the chamber 136 during operation. A valve 140 can be utilized to purge the chamber 136 of pressure. By employing the housing 132, the leakage fluid flows down the sleeve 96 and through ports 134, and can be controlled, and even reversed to control the travel of the halo 106 generally independent of the pressure of the fluid in the halo 106 itself. This allows for a much more uniform pressure of spray liquid applied to the halo 106 during its travel from a top position to a bottom position. As noted in FIG. 11, the nozzles of the halo 106 are oriented so that the jets of spray 107 are angled downwardly somewhat, in the direction of travel during the spray cycle.

The fluid inlet 141 can also be utilized to move the stem 90 upwardly, thus alleviating the need for the spring 100. A pressurized fluid can be applied to the inlet 141, and with the valve 140 opened in a controlled manner, the pressure of the fluid is coupled to the chamber 136. From the chamber 136 the pressurized fluid is coupled through the ports 134 into the sleeve 96. As a result, the pressure exerts a force on the underside of the Teflon bushing 98 and lifts the same. When the bushing 98 is forced upwardly, it carries with it the stem 90. Thus, a pressurized fluid can be applied to the nipple 84 to cause downward movement of the stem 90 and thus the halo 106, and the same or a different pressurized fluid can be applied to the inlet 141 to return the stem 90 and the halo 106 to the rest position. By opening the valve 140, the downward movement of the stem 90 can be controlled, and even stopped. Additional valves and piping can be utilized by those skilled in the art to control the travel of the stem 90.

Without the use of the housing 132, the spring 100 can exert a starting pressure of, for example, 55 psi, and the resulting pressure required to reach full travel of the halo 106 could exceed 100 psi. The parameters that control this include the characteristics of the spring, the volume of the chamber 136 and the travel distance. With the utilization of the housing 132, a starting pressure of 55 psi may require only an ending pressure of 60 psi to obtain full travel.

Mechanically, a stronger spring 100 will exert more resistance and consequently a higher starting pressure to move the halo 106. With a stronger spring 100 the resistance to travel is increased, which results in a much higher ending pressure, which can require higher and more expensive pumps to provide the pressurized spray fluid. With the halo assembly 130, the difference between starting and ending pressures are minimized, resulting in lower pump costs and in most cases no need for the addition of air to the pressurized fluid.

The halo assembly 130 also allows for a very high level of control over halo travel, which in addition to the spray cycle, provides a dramatic shift in the effectiveness of the fluidization cycle as the halo 106 becomes both an obstruction to the loss of fluidization flow as well as a source of additional flow itself. In effect, it serves the additional function of a traveling O-ring, as revealed in Martin patent where placement of O-rings in the outside annular dramatically impacts the fluidization forces.

With regard yet to the halo assembly 130 of FIG. 11, it should be noted that the fluid pressure points of interest are above and below the bushing 98, and at the halo 106. These pressures are involved in the control of the travel characteristics of the halo 106. The travel characteristics of the halo 106 include the velocity of the halo 106 at different locations during the spray cycle, and the length of the travel path. As the incoming flow of the spray fluid enters into the top of the stem 90, a pressure is realized. As the pressure increases, a downward force is exerted on the stem 90, which action pushes against the spring 100 and allows the halo 106 to travel from the top position to the bottom position. It should be noted that the difference in pressure above and below the stem bushing 98 determines the resulting differential pressure that controls the travel of the halo 106. It is further noted that the pressure below the bushing 98 is controlled by the pressure in the chamber 136 of the housing 132. Again, by adjusting either valve 140 or spring tension in the relief valve 138, the pressure buildup in the housing 132 can be controlled and thus the resulting differential pressure on the bushing 98 can be controlled, thereby controlling the travel of the halo 106.

The fluid pressure at the halo 106 is a function of the pressure of the fluid forced into the stem 90. Therefore, the extent of travel of the stem 90 and the halo 106 are dependent on the differential pressure across the bushing 98, but is independent of the pressure at the halo 106. This allows for independent control of the halo pressure from the travel differential pressure across the bushing 98. The result is the ability to maintain a given halo spray pressure independent of the required pressure (differential pressure across the bushing 98) for travel of the halo 106. The result is the ability to obtain a fairly uniform spray pressure during the entire travel from top to bottom to ensure that the entire filter surface to be cleaned is exposed to approximately the same force of the spray.

With reference to FIGS. 12a and 12b, illustrated is a traveling nozzle head 150 adapted for rotation during operation. The traveling nozzle head 150 is connected to the stem 90 by threaded connections. An externally threaded plug 152 is threaded into the internal threads at the lower end of the stem 90. An elastomeric seal ring 154 seals the plug 152 to the end of the stem 90. The plug 152 has a bore 156 formed therethrough. A tubular stub 158 is adapted for insertion through the bore 156 of the plug 152. The stub 158 has a shoulder end 160, and an elastomeric seal ring 162 abuts against the shoulder 160. The seal ring 162 seals the stub 158 to the plug 152 when a pressurized fluid is coupled to the upper end of the stem 90. However, the elastomeric or plastic seal ring 162 allows the stub 158 to rotate within the plug 152. A nozzle head 164 is internally threaded for mating with the external threads on the end of the stub 158. A nozzle 166 is formed through the sidewall of the nozzle head 164. With this arrangement, the nozzle head 164 is able to rotate with the stub 158. FIG. 12b illustrates the nozzle 166 formed in the nozzle head 164. The nozzle 166 can also be formed tangentially in the nozzle head 164 to facilitate rotation. As the liquid pressure is coupled to the stem 90 to telescopically extend the same out of the sleeve 96, the pressurized liquid jetted from the nozzle 166 causes rotation of the nozzle head 164. The rotation of the nozzle head 164 provides a spiral spray path around the inner surface to be cleaned.

FIG. 13 illustrates a number of radial flow fluidizable filters, of the type described in the Martin patent, arranged to make the backwash or fluidizing operation more efficient. The radial flow filters 170, 172, 174 and 176 are shown in a backwash mode, where a supply of pressurized back wash liquid is applied to the valve 178. As described in the Martin patent, the backwash fluid is applied upwardly in the inner perforated cylinder to fluidize the nonbonded media contained in the filter chamber. The pressure of the backwash fluid forces the media to the top of the fluidizing chamber where the residue is separated therefrom and carried out of the top of the inner perforated cylinder and out of the filter. It can be appreciated that if all of the filters 170-176 were to be backwashed at the same time, a substantial pump capacity and backwash liquid volume would be required.

In accordance with the feature of the invention, a number of pressure sensitive valves 180, 182 and 184 are connected in the backwash supply line 186, to effective separate the respective filters from the backwash supply line. It is appreciated that when a radial flow filter of the Martin patent is fluidized, the nonbonded media is raised to the top of the fluidizing chamber, which eventually blocks the flow into the inner perforated cylinder, whereupon the pressure of the backwash fluid increases. The pressure sensitive valves 180-184 are of the type that are normally closed, but in response to a preset pressure, the respective valve opens and allows the pressurized backwash fluid to be coupled to the next, downline filter for fluidizing thereof. The valves 180-184 are of conventional design.

In operation, once the valve 178 is opened to initiate a fluidization cycle of all of the filters 170-176 to backwash the same, the backwash liquid enters the first filter 170 and begins the backwash cycle. During the backwash cycle, the pressure in the line 186 is normal and the downline pressure valve 180 is not operated. However, when the filter 170 is completely fluidized, the pressure in the line 186 increases, thereby opening the valve 180 to allow the backwash fluid to flow to the second filter 172. The pressure of the backwash fluid in the line 186 then increases when the second filter 172 is fluidized, and the cycle continues until all of the filters have been fluidized. Although only four filters are shown, any number could be used. This arrangement is an efficient technique for sequentially and automatically fluidizing a number of filters.

From the foregoing, described is a spray device of various embodiments. The spray device can include a halo with nozzles to apply a jet of pressurized fluid to a cylindrical surface to be cleaned of residue. When a pressurized fluid is applied to the device, the fluid causes the stem of the halo to become telescopically extended to move along the cylindrical surface to be cleaned, while at the same time the pressurized fluid is jetted from the nozzles to remove the residue collected on the cylindrical surface. The halo can have nozzles arranged so that the jetted streams are directed radially inwardly so as to clean the outer surface of a cylinder. The nozzles can also be arranged on the halo so that the pressurized liquid is jetted radially outwardly to clean the inner surface of a cylinder. The spray device can be advantageously employed with the cleaning of cylindrical surfaces of a radial flow filter, as well as the cylindrical surfaces of other devices that require periodic cleaning of residue from cylindrical and other shaped surfaces. The inner surfaces of a cylinder and other shaped surfaces can be cleaned by using a spray device similar to the spray halo, but instead using a nozzle head at the end of the stem. The nozzle head has nozzles arranged so that the pressurized fluid is jetted radially outwardly as the stem is caused to travel along the surface to be cleaned.

While the various embodiments illustrated above employ the spray device oriented in a vertical manner, this is for ease of description. In practice, the spray device can be operated in any orientation without reducing the effectiveness thereof. While the halo is described as being constructed with an annular shape, it can be other shapes to accommodate the shapes of the surfaces to be cleaned. In addition, while a single spray device is illustrated as operating in unison to clean residue from a surface, two or more such devices can be utilized in tandem in a single filter. For example, one spray device can operate from the top of the surface to be cleaned, and a second spray device can be operated from the bottom of the surface to be cleaned, so that each spray device effectively cleans about half the total surface. Both devices can be operated simultaneously and from the same source of pressurized fluid. In addition, while the spray device of the preferred embodiment is effective to jet the pressurized fluid in one direction of travel, those skilled in the art may find it advantageous to adapt the spray devices of the invention to emit jets of pressurized fluid in both directions of travel. One such embodiment could function much like a double acting hydraulic cylinder, where pressure applied to one end of the piston causes the piston to move in one direction, and when the pressure is applied to the other end of the piston, it moves in the other direction. Again, the same pressurized fluid that causes movement of the piston, or the stem of the spray device, can also be coupled to halo or nozzle head. The bottom of the stem can be equipped with a fitting so that the halo and the nozzle head can be exchanged or replaced.

While the preferred and other embodiments of the invention have been disclosed with reference to specific spray devices, it is to be understood that many changes in detail may be made as a matter of engineering choices without departing from the spirit and scope of the invention, as defined by the appended claims.

What is claimed is:

1. A spray device for use in cleaning residue from a filter apparatus, comprising:

an elongated tubular stem for carrying a pressurized fluid therethrough, said elongated tubular stem including a spray member attached thereto;

said spray member having one or more nozzles jetting the pressurized fluid therefrom to clean residue from the filter apparatus;

a tubular sleeve and said elongated tubular stem being telescopic, whereby said elongated tubular stem can move with respect to said tubular sleeve to move said spray member along the filter apparatus to be cleaned; and a housing around said tubular sleeve and a captured chamber between said housing and said tubular sleeve, one or more purge ports in said tubular sleeve to provide a controlled flow of fluid between said tubular sleeve and said captured chamber.

2. The spray device of claim 1, wherein said tubular sleeve includes an inlet through which said pressurized fluid flows, the inlet of said tubular sleeve is located at a first end of said tubular sleeve, and said spray member extends out of a second end of said tubular sleeve.

3. The spray device of claim 2, further including a spring biasing said elongated tubular stem into a retracted position into said tubular sleeve, whereby when the pressurized fluid is coupled to the first end of said tubular sleeve, an axial force is exerted on said elongated tubular stem and forces said elongated tubular stem out of said tubular sleeve against a counterforce of said spring, and said pressurized fluid is carried through said elongated tubular stem to said spray member to be jetted therefrom to remove the residue from the filter apparatus.

4. The spray device of claim 1, wherein said spray member is formed with a tubular material and as a circular halo with said nozzles formed therein.

5. The spray device of claim 1, further including a bushing between said elongated tubular stem and said tubular sleeve, and leakage of pressurized fluid around said bushing passes through said one or more purge ports.

6. The spray device of claim 5, wherein said elongated tubular stem further includes a flange connected thereto, said flange providing a surface area to allow a force of the pressurized fluid to act thereon to move said elongated tubular stem, said flange allowing the pressurized fluid to leak around an annular edge of said flange and around said bushing and through said one or more purge ports.

7. The spray device of claim 1, further including a port formed in a sidewall of said housing for coupling a pressurized fluid therethrough into said housing and through said one or more purge ports to move said elongated tubular stem.

8. The spray device of claim 3, further including a flange attached to said elongated tubular stem to provide a surface upon which a fluid pressure can exert a force on said elongated tubular stem and extend said elongated tubular stem from said tubular sleeve, said flange providing a stop for an end of said spring.

9. The spray device of claim 7, further including a valve coupled to said port formed in said housing, said valve adapted for controlling the flow of pressurized fluid into and out of said captured chamber.

10. A spray device for use in cleaning residue from a filter having a surface to be cleaned, comprising:

a tubular stem and a spray member, said tubular stem having a flange, and said spray member having a plurality of nozzles for jetting a spray onto the surface of the filter to be cleaned;

a support sleeve for supporting said tubular stem therein, said support sleeve fixed to said spray device and allowing telescopic movement of said tubular stem with respect to said support sleeve;

a housing surrounding said support sleeve a space between said housing and said support sleeve defining a captured chamber, said support sleeve having formed therein one or more leakage ports for allowing fluid to flow between said support sleeve and said captured chamber;

a port formed in said housing, and a fluid control mechanism coupled to said port for controlling the flow of fluid into and out of said captured chamber to thereby control the movement of said tubular stem and thus said nozzles; and a fluid connection connected to said support sleeve to permit coupling of the pressurized fluid to said support sleeve and to a surface of said flange of said tubular stem to extend said tubular stem from said support sleeve during cleaning of the surface of the filter, the pressurized fluid also coupled via said tubular stem to said spray member to jet the pressurized fluid onto the surface to be cleaned.

11. The spray device of claim 10, wherein said spray member encircles the surface to be cleaned.

12. The spray device of claim 10, wherein said flange is constructed to allow leakage of the pressurized fluid therearound and into said captured chamber and through said one or more leakage ports the flow rate of the leakage of the pressurized liquid out of said captured chamber controlled by said fluid control mechanism to control the movement of the tubular stem and thus said spray member in one direction.

13. The spray device of claim 12, wherein a pressurized fluid is coupled via said fluid control mechanism into said captured chamber and applied to said flange to move said tubular stem and thus said spray member in a second direction opposite to said first direction.

14. The spray device of claim 10, further including a source of a pressurized liquid and a source of pressurized air coupled to said fluid connection to provide bursts of air in the pressurized liquid to facilitate cleaning of the filter.

15. The spray device of claim 10, wherein a hydraulic pressure is used to return said tubular stem to a retracted position within said support sleeve when the pressurized fluid is removed from said fluid connection.

16. The spray device of claim 10, wherein said purge ports function to control a travel rate of said spray member generally independent of the pressure of the pressurized fluid.

17. The spray device of claim 6, further including a spring engaging said flange for biasing said elongated tubular stem to a rest position, said spring exerting a force on said flange during a spray cycle of said spray device, where the spring force is overcome by a force of the pressurized fluid acting on the surface area of said flange to move said elongated tubular stem and spray member, despite leakage of the pressurized fluid around the annular edge of said flange.

18. A spray device for using a pressurized fluid to clean residue from a filter of a type having a surface to be cleaned, said spray device comprising:

a tubular stem and a spray member, said tubular stem having a radial member, and said spray member having a plurality of nozzles for jetting a spray onto the surface of the filter to be cleaned;

a tubular support sleeve for supporting said tubular stem therein, said tubular support sleeve fixed to said spray device and allowing telescopic movement of said tubular stem with respect to said tubular support sleeve;

the radial member of said tubular stem extending radially between said tubular stem and an inner surface of said tubular support sleeve, but allowing leakage of the pressurized fluid around said radial member, and said radial member having a first surface on which the pressurized fluid acts to move said radial member and thus said tubular stem and spray member in a first direction;

a housing surrounding said tubular support sleeve, a space between said housing and said tubular support sleeve defining a captured chamber, said tubular support sleeve having formed therein one or more leakage ports for allowing fluid to flow between said captured chamber and an internal portion of said tubular support sleeve;

a port formed in said housing, and a fluid control mechanism coupled to said port for controlling a flow of the pressurized fluid into and out of said captured chamber to thereby control the movement of said tubular stem and thus said nozzles; and said fluid control mechanism adapted for coupling the pressurized fluid to said port so that the pressurized fluid flows through said captured chamber and into said tubular support sleeve for acting on a second surface of said radial member to thereby move said tubular stem and said spray member in a second direction opposite said first direction.

19. The spray device of claim 10, wherein said support sleeve is coupled to a source of the pressurized fluid for carrying the pressurized fluid before being sprayed out of said nozzles.

20. The spray device of claim 1, wherein said leakage ports function to control a travel rate of said spray member generally independent of the pressure of the pressurized fluid.

21. The spray device of claim 18, wherein said flow control mechanism functions to control a travel rate of said spray member generally independent of the pressure of the pressurized fluid.

* * * * *